United States Patent
Kienzle et al.

(10) Patent No.: US 6,371,559 B1
(45) Date of Patent: Apr. 16, 2002

(54) REAR SEAT ARRANGEMENT FOR VEHICLES

(75) Inventors: Armin Kienzle, Rottenburg; Christian Wobst, Horb, both of (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 09/550,965

(22) Filed: Apr. 17, 2000

(30) Foreign Application Priority Data

May 8, 1999 (DE) .......................... 199 21 453

(51) Int. Cl.⁷ ................................. B60N 2/30
(52) U.S. Cl. .................... 297/403; 297/331; 297/336; 296/65.09
(58) Field of Search ............... 297/331, 335, 297/336, 378.1, 403, 378.12; 296/65.09, 65.05, 65.16

(56) References Cited

U.S. PATENT DOCUMENTS

| | | | | |
|---|---|---|---|---|
| 4,376,552 A | * | 3/1983 | Pilhall | 297/378.1 X |
| 4,699,418 A | | 10/1987 | Plavetich | |
| 5,795,023 A | | 8/1998 | Kayumi | |
| 5,826,942 A | * | 10/1998 | Sutton et al. | 297/403 X |
| 5,913,570 A | * | 6/1999 | Yoshida et al. | 297/331 |
| 6,155,639 A | * | 12/2000 | Frolo | 297/331 |
| 6,193,317 B1 | * | 2/2001 | Mitschelen et al. | 297/335 X |

FOREIGN PATENT DOCUMENTS

| | | | | |
|---|---|---|---|---|
| DE | 3325927 | 1/1985 | | |
| DE | 3546147 | 7/1986 | | |
| DE | 3913529 | 11/1989 | | |
| DE | 19605191 | 1/1997 | | |
| EP | 0041411 | * 12/1981 | | 297/331 |
| EP | 0 516 512 A 1 | 12/1992 | | |
| FR | 2660260 | * 10/1991 | | 297/331 |
| JP | 004548 | * 1/1989 | | 297/403 |
| JP | 9216529 | 8/1997 | | |

* cited by examiner

*Primary Examiner*—Peter Brown
(74) *Attorney, Agent, or Firm*—Crowell & Moring LLP

(57) ABSTRACT

A rear seat arrangement for vehicles is provided. The rear seat includes a backrest which bears at least one head restraint and can be folded about a pivot spindle secured on the vehicle, and having a seat part which can be pivoted about a multi-joint hinge secured on the seat and on the vehicle, in which arrangement, in order to enlarge the luggage compartment lying behind it, the seat part is pivoted upright onto the front seat arrangement and the backrest is pivoted into the space released by the seat part. In order to avoid the head restraints wearing out when folding over the rear seat arrangement, the at least one head restraint is arranged on the backrest in a manner which allows it to pivot away to the rear, the seat part is graduated towards the front end on its underside, and the multi-joint hinge is designed as a seven-joint hinge in such a manner that the seat part, when pivoted, is raised sufficiently far vertically that the head restraint, which is pivoted away approximately at right angles with respect to the rear side of the backrest, enters into the front graduation on the seat underside and is largely flush with the contour of the seat underside.

12 Claims, 3 Drawing Sheets

REAR SEAT ARRANGEMENT FOR VEHICLES

BACKGROUND OF THE INVENTION

1. Technical Field

The invention relates to a rear seat arrangement for vehicles. More specifically, the present invention relates to a rear seat of a vehicle that is capable of being translated so as to enlarge the luggage compartment of the vehicle.

2. Discussion

With rear seat arrangements of this type, the loading space in saloons and estate cars can be enlarged by folding over the seat part and backrest, the use of a multi-joint hinge making it possible for the seat part to be folded a good distance forwards.

In the case of a known arrangement of this type (DE 39 13 529 A1), the multi-joint hinge is designed as a four-joint hinge which is formed by a link extending between a first joint, which is fixed on the bodywork, and a second joint, which is fixed on the seat part, the second joint, in the sitting position of the seat part, being situated between the first joint and the backrest and lower than the first joint. This design of the multi-joint hinge means that a separate lock, which is customary per se, in the rear region of the seat part, which lock is intended to prevent unintentional folding over of the seat part in the event of severe deceleration, can be omitted, because an inertia force acting in the direction of travel transmits to the seat part a moment which reinforces the position of the seat part.

A rear seat arrangement, which is likewise known, in a motor vehicle (DE 35 46 147 A1) has a four-hinge mechanism which consists of a seat-cushion-side element, which is connected to the seat cushion, a floor-side element, which is directed downwards at the front end of the seat part and is connected to the vehicle floor essentially perpendicular with respect to the longitudinal axis of the vehicle, a lower element, which is connected with its opposite upper and lower ends to the front end section of the seat-cushion-side element and, respectively, to the lower end section of the floor-side element via a bolt connection, and also of an upper element, which is connected with its opposite rear and front ends to the rear end section of the seat-cushion-side element and, respectively, to the lower end section of the floor-side element via a bolt connection in each case. With this four-hinge mechanism, the force required to put the seat part upright is reduced, so that the pivoting into its upright position can be carried out in a simple manner.

The backrests of current rear seat arrangements are conventionally fitted with a respective head restraint which is assigned to a seat and, in the event of the rear seat arrangement being unoccupied, can be pivoted away to the rear in the direction of the rear side of the backrest, to improve the driver's view. For folding the backrest over, when enlarging the loading space, these head restraints have to be removed, since they either impede the folding-down of the backrest behind the raised-up seat part, or else reduce the size of the additional loading area obtained by folding the backrest over.

In order to make it superfluous to take the head restraint away when folding the rear seat arrangement, in the case of a known rear seat arrangement which can be folded in order to enlarge the loading space (DE-33 25 927 C1), the seat cushion is provided on the underside with recesses and can be pivoted into an approximately upright, vertical position about a pivot spindle provided on its front edge. Following the release of a catch assigned to each head restraint, the head restraints can be pivoted rearwards through 90°, and the backrest can be turned over forwards about a spindle arranged on its lower region. At the process of turning the backrest over, each head restraint has entered into one of the recesses. This necessitates precise co-ordination of the dimensions of the backrest and of the arrangement of the pivot spindles of the seat cushion and backrest, and also of the recesses in the underside of the seat cushion.

The invention is based on the object of improving a rear seat arrangement of the type mentioned at the beginning to the effect that folding over the seat part and backrest is possible without the head restraint being taken away.

SUMMARY OF THE INVENTION

It is an objective of the present invention to provide a rear set arrangement that can be translated in order to enlarge the luggage compartment of a vehicle.

It is another objective of the present invention to provide an improved hinge for used for translating the seat part of a rear seat from a seating position to a storage position.

It is yet another objective of the present invention to provide a hinge for translating the seat part of a rear seat from a seating position to a storage position that raises the seat part vertically.

The present invention concerns a rear seat of a vehicle that by means of the multi-joint hinge, the seat part, when folded over, is shifted forwards to the maximum extent, and by means of its structural design according to the invention is raised sufficiently far in its vertical position leaning against the front seat arrangement that a graduation of the seat part, which graduation exists on the underside of the seat part in the front region thereof, comes to lie in the region of the upper end of the folded-over backrest, with the result that the upper end of the backrest, together with the head restraint folded down through approximately 90° onto the rear side, are accommodated in the graduation region of the seat part. The underside of the raised-up seat part, and the rear side of the head restraints, which are put vertically upright in the folded-over horizontal position of the backrest, lie in a continuous plane bounding the loading space. Since the graduation at the front end of the seat cushion on the underside thereof exists per se, it can be used to accommodate the head restraint, and the formation of separate recesses can be omitted.

According to a preferred embodiment of the invention, the multi-joint hinge is designed as a seven-joint hinge which is secured on the vehicle floor with two joint points in front of the front side of a transverse support which is formed on the vehicle floor, protrudes above the floor level and on which the seat part in the sitting position is supported in the region of its graduation, and is secured with one joint point on the seat underside in the graduation region thereof.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The invention is described in more detail below with reference to an exemplary embodiment illustrated in the drawing, in which, in each case in schematic illustration.

DETAILED DESCRIPTION OF THE PREFERRED EMBODIMENT

A rear seat arrangement for a vehicle capable of being translated so as to enlarge the luggage compartment is provided. In the following description, numerous specific details are set forth in order to provide a more comprehensive description of the present invention. It will be apparent, however, to one skilled in the art, that the present invention may be practised without these specific details. In other instances, specific details of well-known features have not been described so as not to obscure the present invention.

Figure 1:
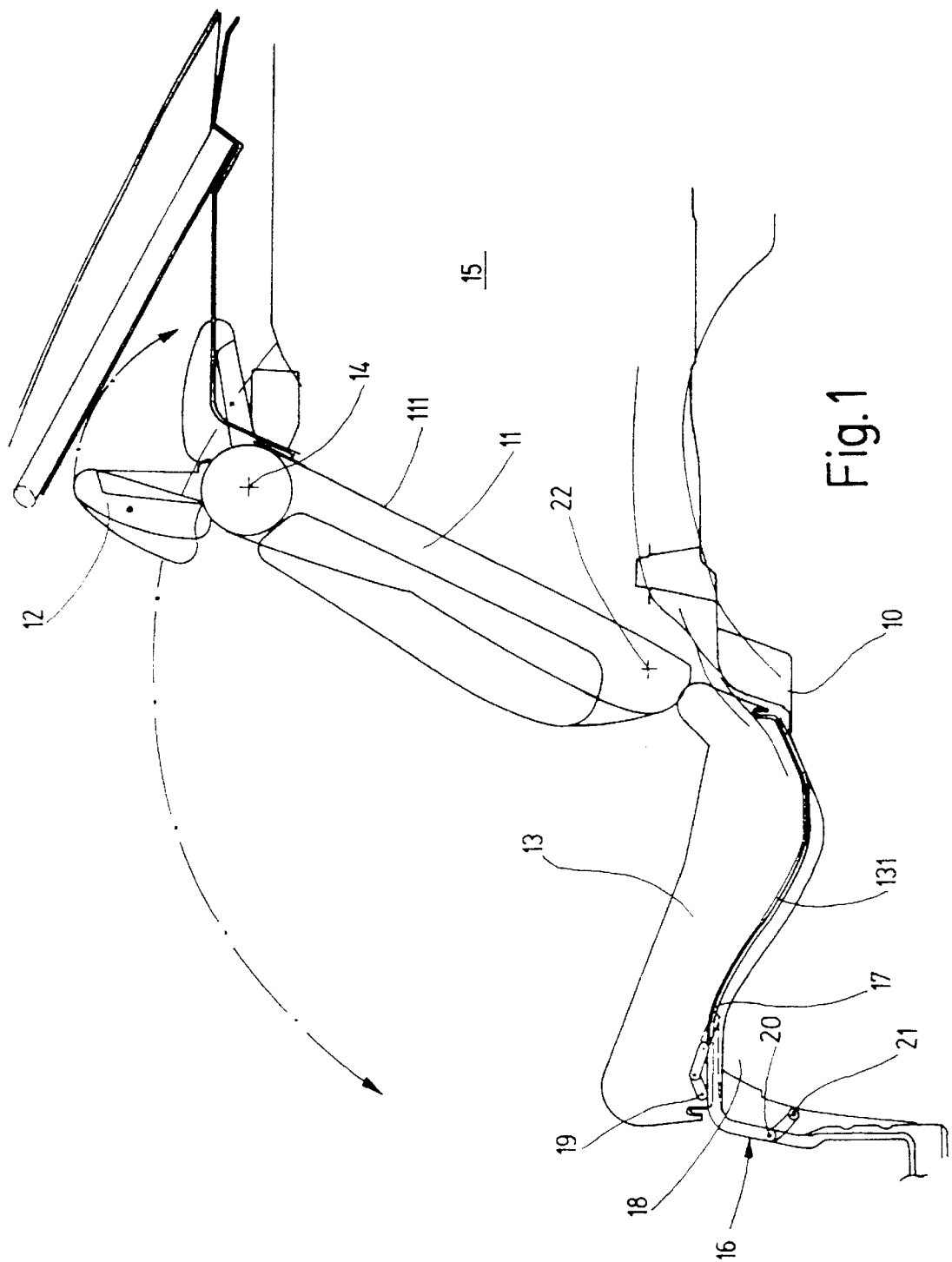
FIG. 1 shows a rear seat arrangement for a car, in the sitting position.
Figure 2:
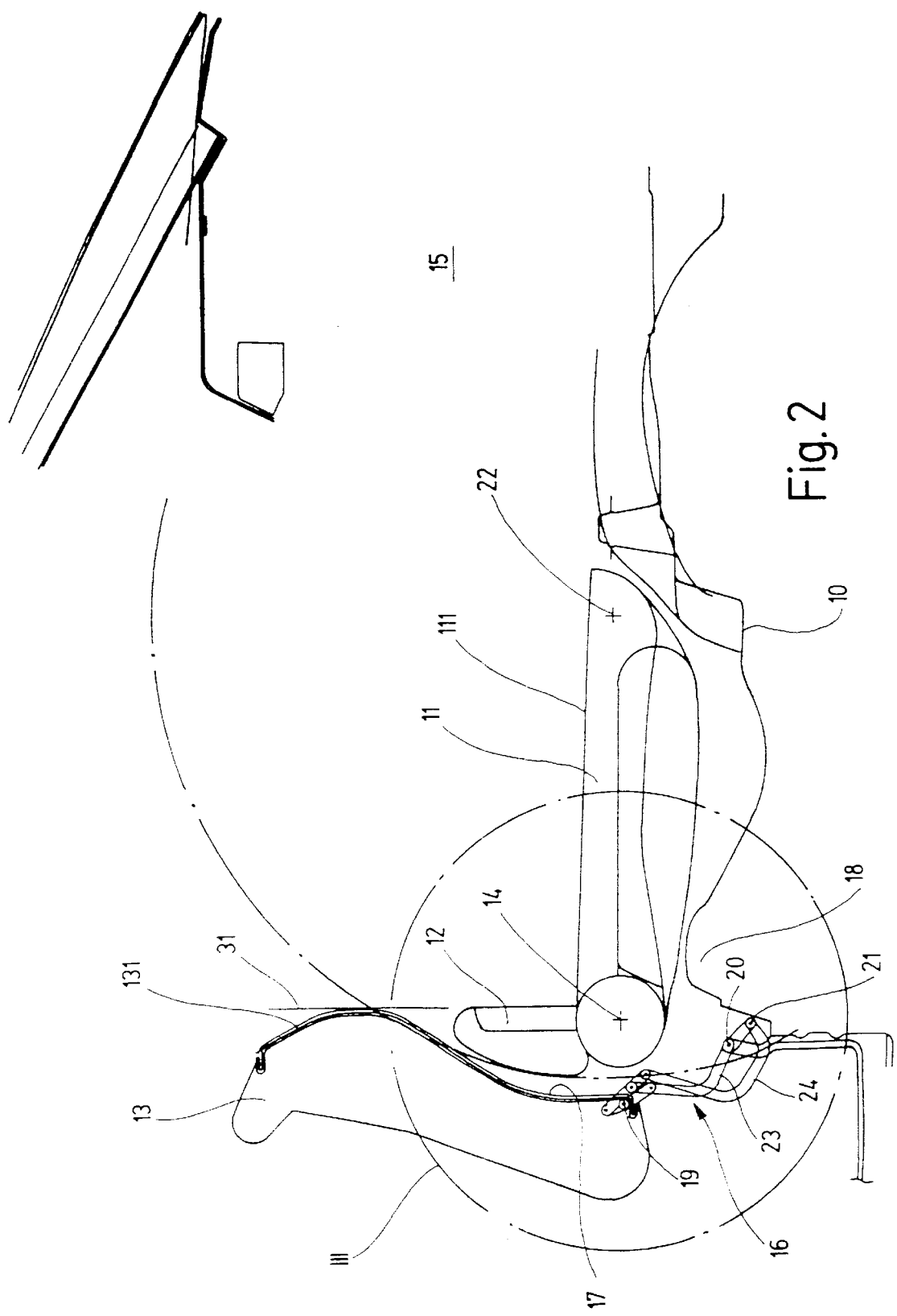
FIG. 2 shows the rear seat arrangement in FIG. 1, in a folded-over position serving to enlarge the loading space.

The rear seat arrangement, outlined in FIGS. 1 and 2, for a car comprises a backrest 11, which is fitted with a head restraint 12 per seat, and a seat part 13. As is indicated in FIG. 1, the head restraints 12 are held on the upper edge of the backrest 11 in a manner which allows them to pivot about a pivot spindle 14, and, in the event of the rear seat arrangement not being occupied, can be folded down to the rear in the direction of the rear side 111 of the backrest 11, to improve the driver's view. The backrest 11, which can also be of divided design, is secured on the vehicle and, after a lock is cancelled, can be pivoted forwards about a pivot spindle 22 secured on the vehicle. In order to enlarge a luggage compartment 15 situated behind the backrest 11, the seat part 13 can be moved from its sitting position, which is illustrated in FIG. 1, into an upright folded-over position, which is illustrated in FIG. 2, in which it stands approximately vertically behind a front seat arrangement, and after that the backrest 11 can be moved into an approximately horizontal folded-over position, which is illustrated in FIG. 2, in which its rear side 111 forms a loading area. The pivoting of the seat part 13 is made possible by two multi-joint hinges 16, one of which is secured on the right, and one on the left, on the seat and on the vehicle in the vicinity of the front end of the seat part 13.

Figure 3:
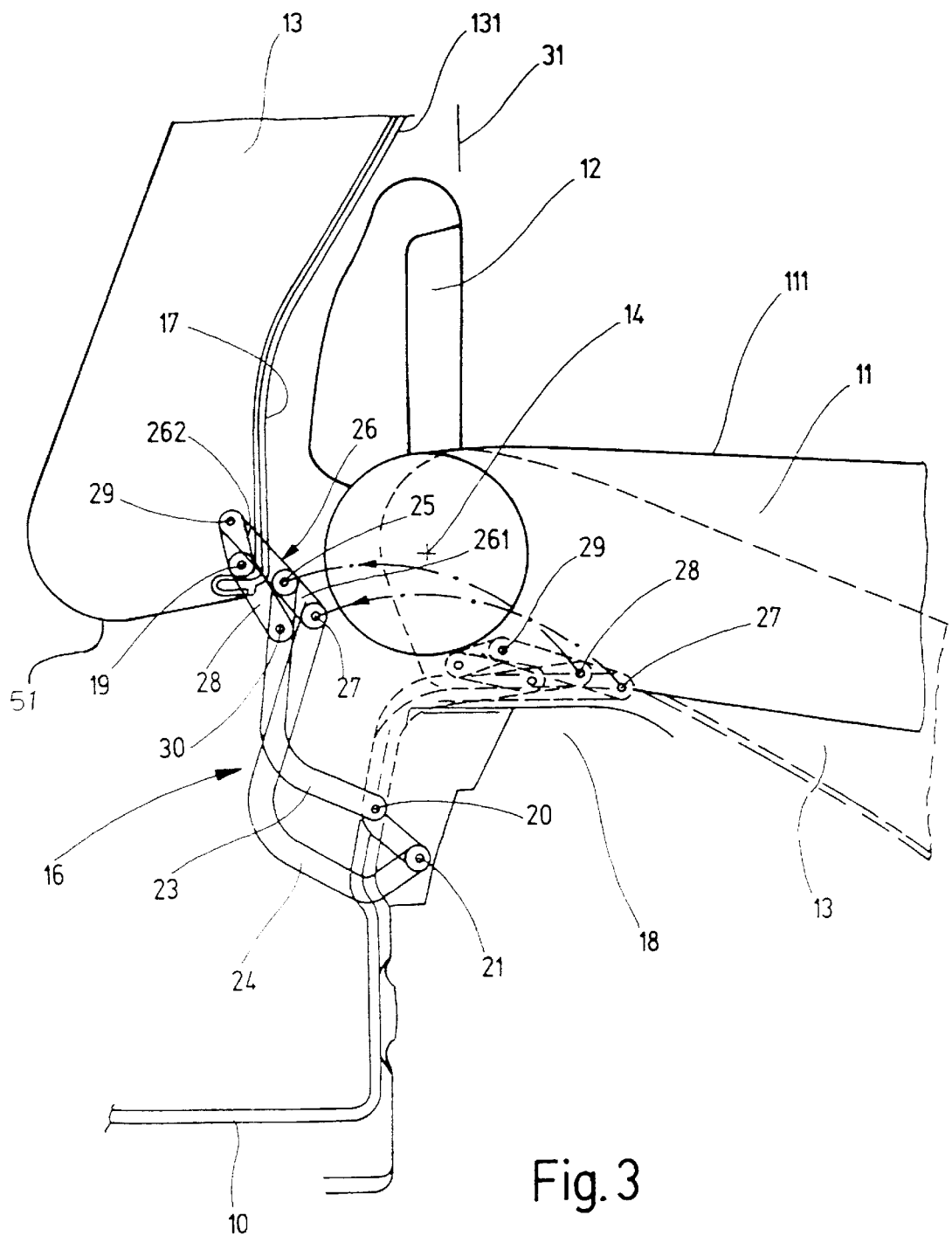
FIG. 3 shows an enlarged illustration of the detail III in FIG. 2.

The seat part 13 is graduated towards the front end on its underside 131 and is supported, with this front graduation 17, on a transverse support 18, which is formed on the vehicle floor 10 and protrudes above the floor level, while the said seat part is accommodated in the rear region by a floor pan tapering away from the transverse support 18. The multi-joint hinge 16, which is designed as a seven-joint hinge, is secured with one joint point 19 in the graduation region 17 on the underside 131 of the seat part 13, and on the vehicle floor 10 with two joint points 20, 21 on the front side, as seen in the direction of travel, of the transverse support 18. As the enlarged illustration in FIG. 3 shows, the multi-joint hinge 16 comprises two angled links 23, 24 which are secured pivotally at their one link end on the vehicle floor 10, with the joint points 20, 21, in front of the front side of the transverse support 18, the joint point 20 of the first link 23 being situated above the joint point 21 of the second link 24, the hinge further comprising a two-armed lever 26 which is secured pivotally at the other link end of the first link 23 at the joint point 25 and to whose one lever arm 261 the other link end of the second link 24 is coupled at joint point 27, and also comprises a toggle lever 28 which is coupled on the end sides to the other lever arm 262 at joint point 29, at one end, and, at the other end, to the first link 23 at a distance from its link end supporting the two-armed lever 26, at joint point 30, and is secured pivotally on the underside 131 of the seat part 13 with its toggle point (joint point 19).

In the sitting position of the rear seat arrangement, the multi-joint hinge 16 assumes the position illustrated in FIG. 1, in which the two angled links 23, 24 extend along the front side of the transverse support 18, and the lever 26 and toggle lever 28 are enclosed between the upper side of the transverse support 18 and the underside 131 of the seat part 13, in the region of the graduation 17. This position of the multi-joint hinge 16 is additionally drawn in FIG. 3 with dashed lines. If the seat part 13 is folded forwards via the multi-joint hinge 16, the joint points 27 and 28 move on overlapping circular paths, as marked out in FIG. 3 by dashed-dotted arrow lines, and at the end of the pivoting movement, the multi-joint hinge 16 assumes its position illustrated in FIG. 3 by solid lines. In this position, the seat part 13 is not only pivoted forwards to the maximum extent into the foot well, but at the same time is raised vertically over a distance and bears against the backrests of the front seat arrangement. The seat part 13 is raised vertically such that the front edge 51 thereof in its storage position (FIG. 3, solid lines) is disposed substantially above the underside 131 while the seat part 13 is in the seating position (FIG. 3, dashed lines). The vertical, raised distance is dimensioned here in such a manner that the end of the backrest 11, which is folded forwards about its pivot spindle 22 secured on the vehicle, can, together with the head restraint 12, which is pivoted away through approximately 90° in the direction of the rear side 111 of the backrest 11, pivot into the graduation 17 on the underside 131 of the seat part 13 (FIGS. 2 and 3). As indicated in FIGS. 2 and 3 by a locating mark 31, in this arrangement the rear side of the head restraint 12 and the contour of the underside 131 of the seat part 13, which contour extends the furthest in the direction of the luggage compartment 15, lie in a common plane.

The foregoing description constitutes the preferred embodiments devised by the inventors for practising the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A rear seat arrangement for a vehicle comprising:
    a backrest which can be folded about a pivot spindle secured on the vehicle from an upright seating position into an approximately horizontal storage position in which a rear side of the backrest forms a loading surface,
    a seat part attached to the vehicle which seat part includes a graduation formed on an underside that extends towards a front edge of the seat part and, in order to enlarge a luggage compartment, said seat part can be pivoted by a multi-joint hinge which is disposed near the front edge of the seat part and is secured on the seat part and on the vehicle, said seat part being moveable from an approximately horizontal seating position into a storage position in which said seat part is approximately upright, and
    a head restraint carried by said backrest in a pivotal manner which allows said head restraint to pivot away to a rear side of said backrest, said underside of said seat part having a graduated region disposed towards a front end of said seat part, said multi-joint hinge being designed so as to allow said front edge of said seat part, when pivoted into the upright storage position, to be raised vertically thereby said head restraint enters into said graduated underside and is substantially flush with the underside.

2. A rear seat arrangement for a vehicle comprising, a backrest which can be folded about a pivot spindle secured on the vehicle from an upright seating position into an approximately horizontal storage position in which a rear side of the backrest forms a loading surface, a seat part attached to the vehicle which said seat part includes a graduation formed on an underside that extends towards a front edge of the seat part and, in order to enlarge a luggage compartment, said seat part can be pivoted by a multi-joint hinge which is disposed near the front edge of the seat part and is secured on the seat part and on the vehicle, said seat part moveable from an approximately horizontal seating position into a storage position in which said seat part is approximately upright, and a head restraint carried by said backrest in a pivotal manner which allows said head restraint to pivot away to a rear side of said backrest, said underside of said seat part having a graduated region disposed towards a front end of said seat part, said multi-joint hinge being designed so as to allow said seat part, when pivoted into the upright storage position, to be raised vertically thereby said head restraint enters into said graduated underside and is substantially flush with the underside, wherein said multi-joint hinge is a seven-joint hinge which is secured on a vehicle floor via a first and second joint point in front of a transverse support which is formed on said vehicle floor, wherein said transverse support protrudes upward from said vehicle floor and is disposed such that said seat part, while in said seating position, is supported in said graduated region by said traverse support, and wherein said multi-joint hinge is secured with a third joint point to said underside of said seat part in said graduated region.

3. The rear seat arrangement according to claim 2, wherein said first and second joint points are disposed at a distance below an upper side of said transverse support, said upper side capable of supporting said seat part while said seat part is in said seating position.

4. The rear seat arrangement according to claim 3, wherein said multi-joint hinge includes a first and second angled link, said first link being pivotally secured to said vehicle floor at a first end at said first joint point, said second link being pivotally secured to said vehicle floor at a first end at said second joint point, a two-armed lever which is secured pivotally to said second link and said first link, and a toggle lever which is pivotally coupled to said first link and said two-armed lever, and wherein said toggle lever is pivotally secured to said underside of said seat part.

5. The rear seat arrangement according to claim 4, wherein said first joint point lies above said second joint point.

6. The rear seat arrangement according to claim 5, wherein said toggle lever is pivotally secured to said seat part and said two-aimed lever at the same location.

7. A rear seat for a motor vehicle having a backrest which includes at least one head restraint attached thereto, said backrest capable of being folded from a first seating position to a substantially horizontal storage position, said rear seat also having a seat part that includes a front edge and an underside that lies adjacent to a vehicle floor when in a first seating position, said rear seat comprising:

a multi-joint hinge interconnecting said seat part and said floor, said seat part being moveable from said first seating position to a second storage position, said front edge of said seat part, when in said storage position being disposed vertically above said underside of said seat part while in said seating position.

8. The rear seat according to claim 7, wherein said seat part is moveable independently of said backrest, said seat part being moveable from said seating position in which said seat part is substantially horizontal to said storage position in which said seat part is substantially vertical.

9. The rear seat according to claim 8, wherein said seat part is interconnected to said floor via a multi-joint link.

10. The rear seat according to claim 9, wherein said multi-joint link includes first and second angled links pivotally attached to a two armed lever at a first and second joint.

11. The rear seat according to claim 10, wherein said first joint moves along a first curved path when said seat part is moved from said seating position to said storage position, and said second joint moves along a second curved path when said seat part is moved from said seating position to said storage position, and wherein said first and second curved paths intersect each other during movement of said seat part from said seating position to said storage position.

12. A rear seat for a motor vehicle having a backrest which includes at least one head restraint attached thereto, said backrest capable of being folded from a first seating position to a substantially horizontal storage position, said rear seat also having a seat part that includes a front edge and an uderside that lies adjacent to a vehicle floor when in a first seating position, said rear seat comprising:

a multi-join hinge interconnecting said seat part and said floor, said seat part being moveable from said first seating position to a second storage position, said front edge of said seat part, when in said storage position, being disposed vertically above said underside of said seat part while in said seating position so that the head restraint when folded backward fits into the underside of said seat part.

\* \* \* \* \*